US012413154B2

(12) United States Patent
Meng et al.

(10) Patent No.: US 12,413,154 B2
(45) Date of Patent: Sep. 9, 2025

(54) CONTROL CIRCUIT FOR SYNCHRONOUS RECTIFICATION SWITCH OF POWER CONVERTER

(71) Applicant: Power Forest Technology Corporation, Hsinchu County (TW)

(72) Inventors: Che-Hao Meng, Hsinchu (TW); Chien Lung Li, Hsinchu County (TW); Chia-Hsien Liu, Hsinchu County (TW)

(73) Assignee: Power Forest Technology Corporation, Hsinchu County (TW)

( * ) Notice: Subject to any disclaimer, the term of this patent is extended or adjusted under 35 U.S.C. 154(b) by 205 days.

(21) Appl. No.: 18/509,208

(22) Filed: Nov. 14, 2023

(65) Prior Publication Data

US 2025/0105754 A1    Mar. 27, 2025

(30) Foreign Application Priority Data

Sep. 27, 2023    (TW) .................................. 112137134

(51) Int. Cl.
*H02M 3/335*    (2006.01)
*H02M 1/00*    (2006.01)
(52) U.S. Cl.
CPC ..... *H02M 3/33592* (2013.01); *H02M 1/0012* (2021.05)
(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 8,976,547 B2 *    3/2015    Ren .................... H02M 1/32
                                                            363/21.14
10,056,845 B1    8/2018    Chu
(Continued)

FOREIGN PATENT DOCUMENTS

CN    103368394    10/2013
CN    103546047    4/2016
(Continued)

OTHER PUBLICATIONS

"Office Action of Taiwan Counterpart Application", issued on Sep. 11, 2024, p. 1-p. 9.

*Primary Examiner* — Jeffrey A Gblende
(74) *Attorney, Agent, or Firm* — JCIPRNET

(57) ABSTRACT

A control circuit for a synchronous rectification switch of a power converter is provided. The synchronous rectification switch and a transformer of the power converter are coupled to a connection node. The control circuit includes a first logic circuit, an integrating circuit, a setting comparator, a logic gate, and a second logic circuit. The first logic circuit provides a detection signal according to a detection voltage on the connection node. The integrating circuit performs an accumulation operation on the integrated voltage value based on the detection signal to generate a setting pulse. The setting comparator provides a comparison signal according to the detection voltage and a first predetermined voltage. The logic gate outputs a setting signal according to the setting pulse and the comparison signal. The second logic circuit continuously provides a turn-on control signal in response to the setting signal. The synchronous rectification switch is turned on in response to the turn-on control signal.

10 Claims, 4 Drawing Sheets

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491

See application file for complete search history.

(56) References Cited

U.S. PATENT DOCUMENTS

| | | | |
|---|---|---|---|
| 10,312,799 B1 | 6/2019 | Turchi et al. | |
| 10,432,104 B2 | 10/2019 | Li et al. | |
| 10,819,211 B2 * | 10/2020 | Yang | H02M 3/33507 |
| 11,581,804 B1 * | 2/2023 | Langeslag | H02M 3/33569 |
| 2006/0018135 A1 | 1/2006 | Yang et al. | |

FOREIGN PATENT DOCUMENTS

| | | |
|---|---|---|
| CN | 107276434 | 10/2017 |
| CN | 215580941 | 1/2022 |

* cited by examiner

CONTROL CIRCUIT FOR SYNCHRONOUS RECTIFICATION SWITCH OF POWER CONVERTER

CROSS-REFERENCE TO RELATED APPLICATION

This application claims the priority benefit of Taiwan application serial no. 112137134, filed on Sep. 27, 2023. The entirety of the above-mentioned patent application is hereby incorporated by reference herein and made a part of this specification.

BACKGROUND

Technical Field

The disclosure relates to a control circuit, and particularly relates to a control circuit for a synchronous rectification switch of a power converter.

Description of Related Art

Generally, a power converter may use a synchronous rectification switch to perform a synchronous rectification operation. The synchronous rectification switch requires a control signal to implement the synchronous rectification operation. The synchronous rectification switch is connected to a transformer of the power converter via a connection node. The control signal may be generated based on a voltage value on the connection node. When the voltage value on the connection node drops to a predetermined voltage value, the control signal is generated to turn on the synchronous rectification switch. When the voltage value on the connection node rises to another predetermined voltage value, the control signal is generated to turn off the synchronous rectification switch.

However, in actual applications, the voltage value on the connection node usually oscillates. The above-mentioned oscillation will cause fluctuation of a voltage level of the control signal, causing the synchronous rectifier switch to perform frequent erroneous switching operations. Therefore, the power converter provides an incorrect output voltage. Therefore, to provide a stable control signal is one of the research focuses of those skilled in the art.

SUMMARY

The disclosure is directed to a control circuit. The control circuit is adapted to provide a stable control signal to control a synchronous rectification switch.

The disclosure provides a control circuit for a synchronous rectification switch of a power converter. The synchronous rectification switch and a transformer of the power converter are coupled to a connection node. The control circuit includes a first logic circuit, an integrating circuit, a setting comparator, a logic gate, and a second logic circuit. The first logic circuit is coupled to the connection node. The first logic circuit receives a detection voltage on the connection node, and provides a detection signal according to the detection voltage. The integrating circuit is coupled to the first logic circuit. The integrating circuit performs an accumulation operation on an integrated voltage value based on the detection signal, and discharges the integrated voltage value when the integrated voltage value rises to a predetermined value, so as to generate a setting pulse. The setting comparator receives the detection voltage and a first predetermined voltage, and provide a comparison signal according to a comparison result of the detection voltage and the first predetermined voltage. The logic gate is coupled to the integrating circuit and the setting comparator. The logic gate outputs a setting signal according to the setting pulse and the comparison signal. The second logic circuit is coupled to the logic gate. The second logic circuit continuously provides a turn-on control signal in response to the setting signal. The synchronous rectification switch is turned on in response to the turn-on control signal.

Based on the above description, the integrating circuit generates the setting pulse. The logic gate outputs the setting signal based on the setting pulse and the comparison signal. The second logic circuit continuously provides the turn-on control signal in response to the setting signal. In this way, the control circuit may provide the stable turn-on control signal to control the synchronous rectification switch.

DESCRIPTION OF THE EMBODIMENTS

Figure 1:
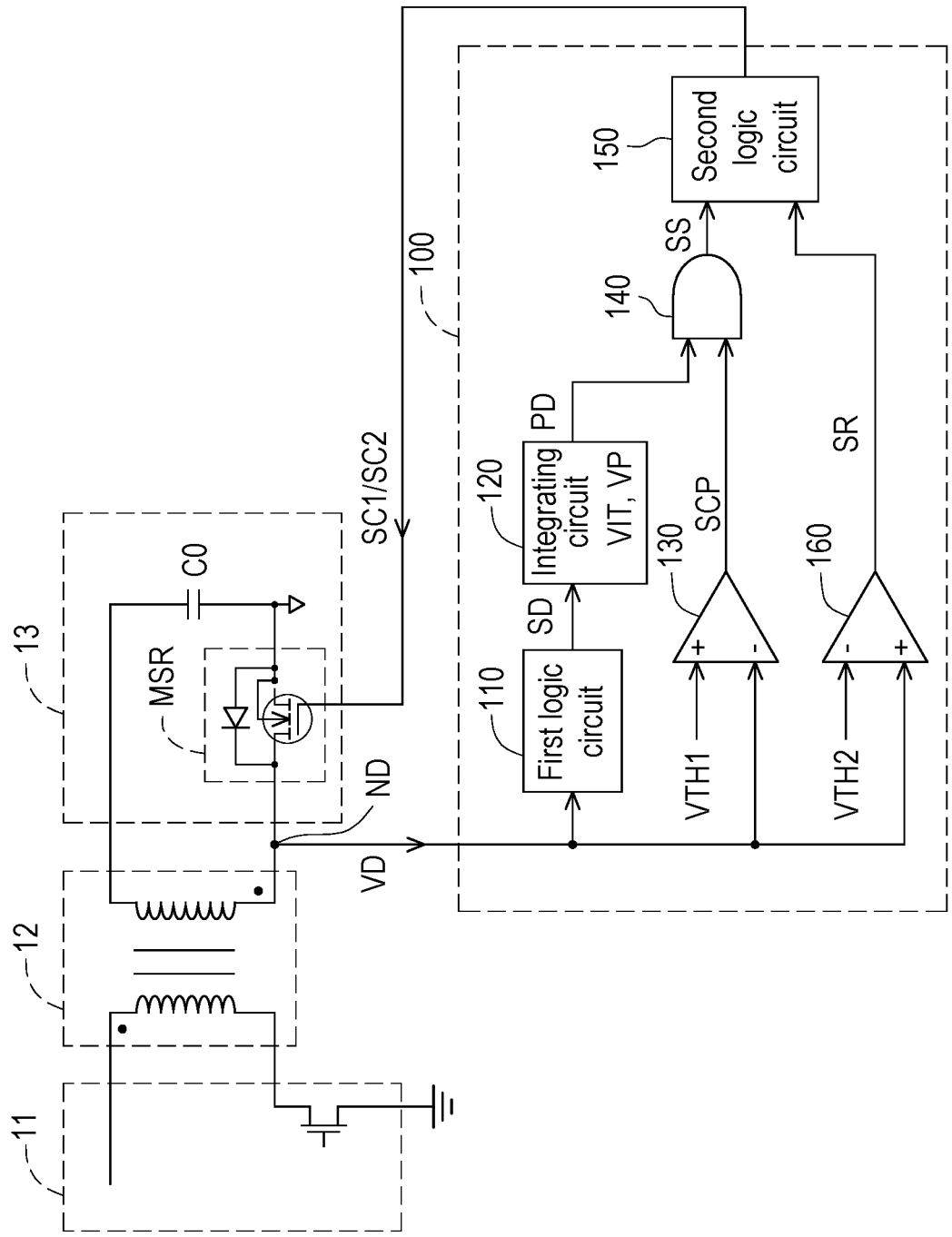
FIG. 1 is a schematic diagram of a power converter according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts. Theses exemplary embodiments are only a part of the disclosure, and the disclosure does not disclose all of the implementations. More precisely, these exemplary embodiments are only examples of the system and method in the claims of the disclosure.

Referring to FIG. 1. FIG. 1 is a schematic diagram of a power converter according to an embodiment of the disclosure. In the embodiment, a power converter 10 includes a primary side circuit 11, a transformer 12, a secondary side circuit 13 and a control circuit 100. A primary winding of the transformer 12 is coupled to the primary side circuit 11. A secondary winding of the transformer 12 is coupled to the secondary side circuit 13. The secondary side circuit 13 includes a synchronous rectification switch MSR and an output capacitor C0. Taking the embodiment as an example, the output capacitor C0 is coupled between a first terminal of the secondary winding of the transformer 12 and a ground terminal of the secondary side circuit 13. A first terminal of the synchronous rectification switch MSR is coupled to a connection node ND and a second terminal of the secondary winding. Namely, the synchronous rectification switch MSR and the transformer 12 are coupled to the connection node ND. A second terminal of the synchronous rectifier switch MSR is coupled to the ground terminal of the secondary side circuit 13. A control terminal of the synchronous rectification switch MSR is coupled to the control circuit 100.

In the embodiment, the control circuit 100 is configured to control the synchronous rectification switch MSR. The control circuit 100 includes a first logic circuit 110, an integrating circuit 120, a setting comparator 130, a logic gate 140 and a second logic circuit 150. The first logic circuit 110 is coupled to the connection node ND. The first logic circuit 110 receives a detection voltage VD located on the connection node ND, and provides a detection signal SD according to the detection voltage VD. The integrating circuit 120 is coupled to the first logic circuit 110. The integrating circuit 120 performs an accumulation operation on an integrated voltage value VIT based on the detection signal SD, and discharges the integrated voltage value VIT when the integrated voltage value VIT rises to a predetermined value VP, so as to generate a setting pulse PD.

In the embodiment, the setting comparator 130 receives the detection voltage VD and a first predetermined voltage VTH1. The setting comparator 130 provides a comparison signal SCP according to a comparison result of the detection voltage VD and the first predetermined voltage VTH1. The logic gate 140 is coupled to the integrating circuit 120 and the setting comparator 130. The logic gate 140 outputs a setting signal SS according to the setting pulse PD and the comparison signal SCP. The second logic circuit 150 is coupled to the logic gate 140. The second logic circuit 150 continuously provides a turn-on control signal SC1 in response to the setting signal SS. Therefore, the synchronous rectification switch MSR is turned on in response to the turn-on control signal SC1.

It should be noted here that the integrating circuit 120 generates the setting pulse PD. The logic gate 140 outputs the setting signal SS according to the setting pulse PD and the comparison signal SCP. The second logic circuit 150 continuously provides the turn-on control signal SC1 in response to the setting signal SS. In this way, the control circuit 100 may provide the stable turn-on control signal SC1 to control the synchronous rectification switch MSR.

In this embodiment, the first logic circuit 110 may be an inverter. When the detection voltage VD is lower than a threshold voltage value of a transistor in the first logic circuit 110, the first logic circuit 110 provides the detection signal SD with a high logic value. The integrating circuit 120 uses the detection signal SD with the high logic value to perform an accumulation operation on the integrated voltage value VIT. During the accumulation operation, the integrated voltage value VIT may gradually rise from a low voltage level. Once the integrated voltage value VIT rises to the predetermined value VP, the integrating circuit 120 pulls down the integrated voltage value VIT to the low voltage level.

On the other hand, when the detection voltage VD is higher than the threshold voltage value of the transistor in the first logic circuit 110, the first logic circuit 110 provides the detection signal SD with a low logic value. The integrating circuit 120 may not utilize the detection signal SD with the low logic value to perform the accumulation operation on the integrated voltage value VIT.

It should be noted that the first logic circuit 110 determines a logic level of the detection signal SD based on the comparison result between the detection voltage VD and at least one threshold voltage value in the first logic circuit 110. Therefore, the embodiment does not require an additional comparator to determine the logic level of the detection signal SD.

In the embodiment, a non-inverted input terminal of the setting comparator 130 receives the first predetermined voltage VTH1. An inverted input terminal of the setting comparator 130 receives the detection voltage VD. When the detection voltage VD is lower than the first predetermined voltage VTH1, the setting comparator 130 provides the comparison signal SCP with a first logic value. When the detection voltage VD is higher than or equal to the first predetermined voltage VTH1, the setting comparator 130 provides the comparison signal SCP with a second logic value. The first logic value is the high logic value. The second logic value is the low logic value. In the embodiment, the logic gate 140 may be an AND gate. Therefore, when the comparison signal SCP has the first logic value, the logic gate 140 outputs the setting signal SS. A logic pulse of the setting signal SS is determined based on a timing of the setting pulse PD. On the other hand, when the comparison signal SCP has the second logic value, the logic gate 140 outputs a signal with the low logic value.

In the embodiment, the control circuit 100 further includes a reset comparator 160. The reset comparator 160 receives the detection voltage VD and a second predetermined voltage VTH2, and is configured to provide a reset signal SR according to a comparison result of the detection voltage VD and the second predetermined voltage VTH2. The first predetermined voltage VTH1 is lower than the second predetermined voltage VTH2. For example, the first predetermined voltage VTH1 is −0.1 volt (V). The second predetermined voltage VTH2 is, for example, 1 V. Therefore, the reset signal SR with the first logic value and the setting signal SS with the first logic value are not generated at the same time. The second logic circuit 150 provides a turn-off control signal SC2 in response to the reset signal SR. The synchronous rectification switch MSR is turned off in response to the reset signal SR.

A non-inverted input terminal of the reset comparator 160 receives the detection voltage VD. An inverted input terminal of the reset comparator 160 receives the first predetermined voltage VTH1. When the detection voltage VD is higher than the second predetermined voltage VTH2, the reset comparator 160 provides the reset signal SR with the first logic value. When the detection voltage VD is lower than or equal to the second predetermined voltage VTH2, the reset comparator 160 provides the reset signal SR with the second logic value.

In the embodiment, the second logic circuit 150 may be implemented by an SR flip-flop. The second logic circuit 150 has a setting input terminal, a reset input terminal, and an output terminal. The setting input terminal of the second logic circuit 150 is coupled to an output terminal of the logic gate 140. The reset input terminal of the second logic circuit 150 is coupled to an output terminal of the reset comparator 160. The output terminal of the second logic circuit 150 is coupled to the control terminal of the synchronous rectifier switch MSR.

Figure 2:
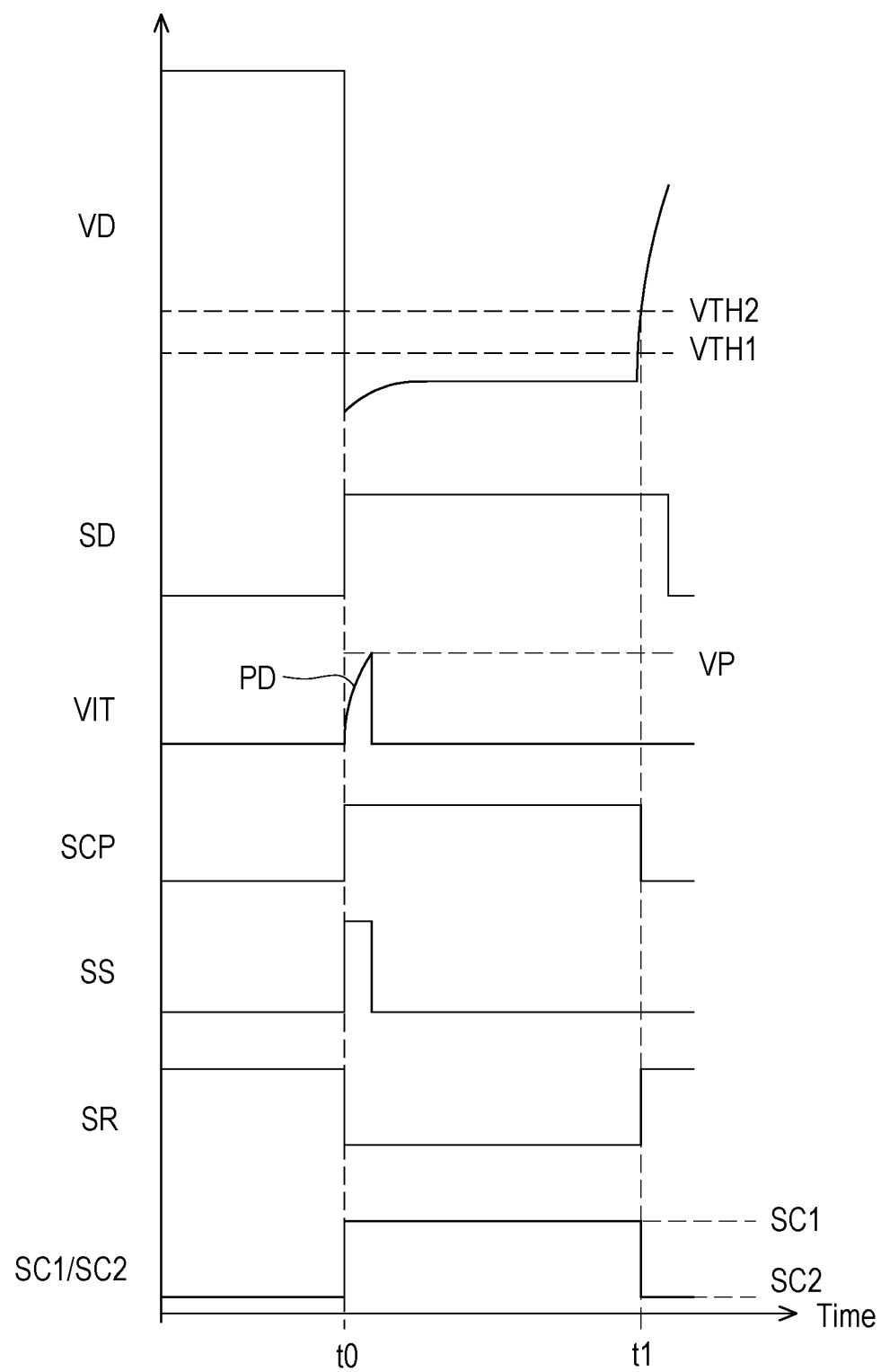
FIG. 2 is a schematic waveform diagram according to an embodiment of the disclosure.

Referring to FIG. 1 and FIG. 2 at the same time. FIG. 2 is a schematic waveform diagram according to an embodiment of the disclosure. In the embodiment, at a time point t0, the detection voltage VD is lower than the first predetermined voltage VTH1, and the comparison signal SCP has the first logic value (i.e., a high logic value). The setting pulse PD is generated. The comparison signal SCP has the first logic value. Furthermore, the reset signal SR has the second logic value (i.e., a low logic value). Therefore, the second logic circuit 150 continuously provides the turn-on control signal SC1 in a period from the time point t0 to a time point t1 based on the logic pulse of the setting signal SS. The turn-on control signal SC1 is a control signal with a high voltage level.

At the time point t1, the detection voltage VD is higher than the second predetermined voltage VTH2. The comparison signal SCP has the second logic value (i.e., a low logic value). The setting pulse PD is not generated. Furthermore, the reset signal SR has the first logic value (i.e., a high logic value). Therefore, the second logic circuit 150 provides the turn-off control signal SC2 based on the logic pulse of the setting signal SS at the time point t1. The turn-off control signal SC2 is a control signal with a low voltage level.

In the embodiment, the first predetermined voltage VTH1 and the second predetermined voltage VTH2 may be determined based on oscillation of the detection voltage VD when the synchronous rectification switch MSR is turned on. A voltage value range between the first predetermined voltage VTH1 and the second predetermined voltage VTH2 is greater than an oscillation range of the detection voltage VD. Therefore, the second logic circuit 150 will not perform an erroneous switching operation on the synchronous rectification switch MSR due to the oscillation of the detection voltage VD.

Figure 3:
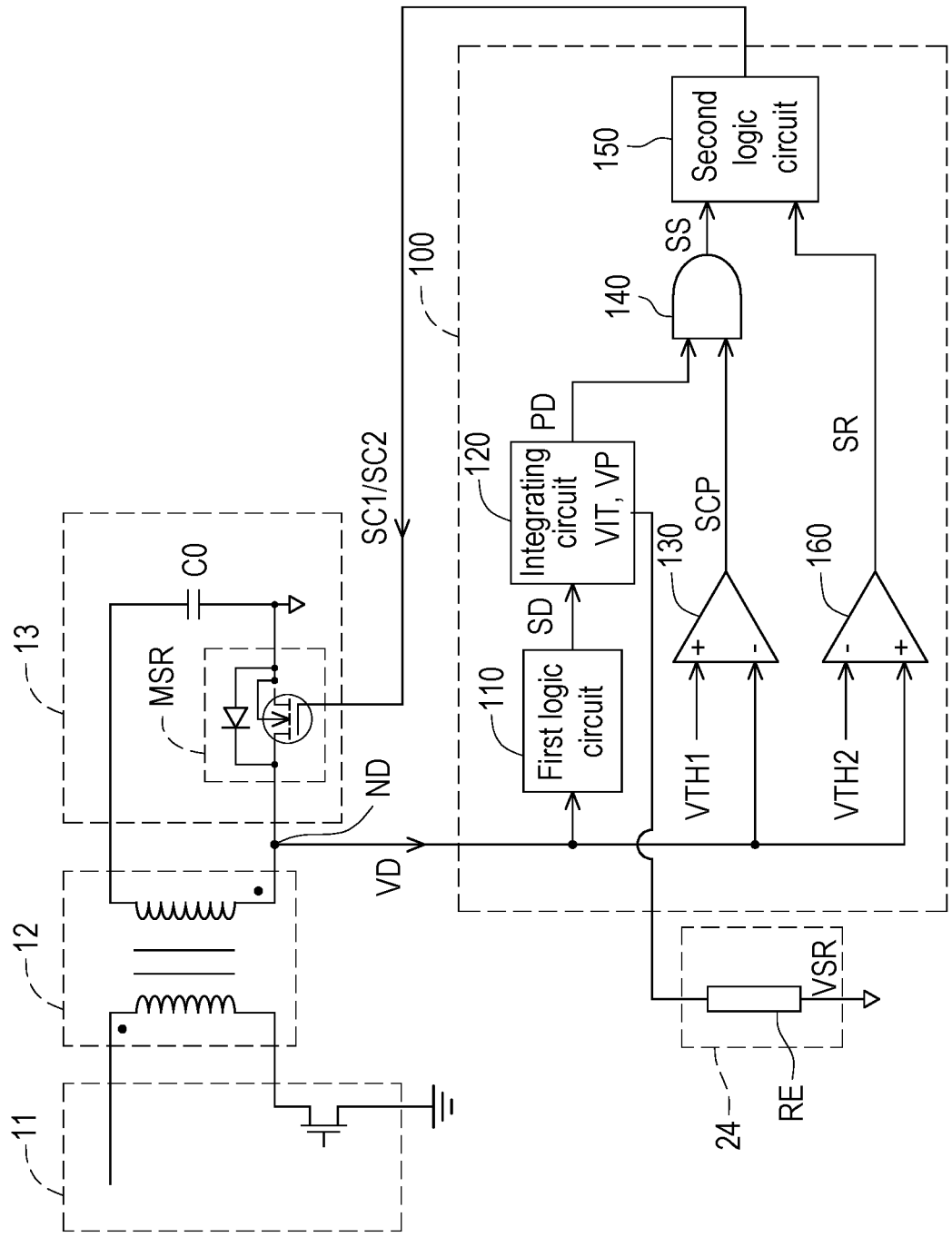
FIG. 3 is a schematic diagram of a power converter according to an embodiment of the disclosure.

Referring to FIG. 3. FIG. 3 is a schematic diagram of a power converter according to an embodiment of the disclosure. In the embodiment, a power converter 20 includes the primary side circuit 11, the transformer 12, the secondary side circuit 13, the control circuit 100 and an adjustment circuit 24. The control circuit 100 includes the first logic circuit 110, the integrating circuit 120, the setting comparator 130, the logic gate 140, the second logic circuit 150 and the reset comparator 160. Implementations of the primary side circuit 11, the transformer 12, the secondary side circuit 13, the first logic circuit 110, the setting comparator 130, the logic gate 140, the second logic circuit 150 and the reset comparator 160 have been clearly described with reference of FIG. 1 and FIG. 2, and details thereof are not repeated.

In the embodiment, the adjustment circuit 24 is coupled to the integrating circuit 120. The adjustment circuit 24 adjusts the predetermined value VP according to the setting resistance value VSR. Therefore, a time length for charging the integrated voltage value VIT may be adjusted. A pulse width of the setting pulse PD and a pulse width of the logic pulse of the setting signal SS may also be adjusted. The adjustment circuit 24 includes a resistance value generating circuit RE. The resistance value generating circuit RE provides the setting resistance value VSR. For example, the resistance value generating circuit RE may be a variable resistance circuit. For example, when the set resistance value VSR is increased, the predetermined value VP is increased. Therefore, the pulse width of the setting pulse PD and the pulse width of the logic pulse of the setting signal SS are also increased. On the other hand, when the setting resistance value VSR is decreased, the predetermined value VP is decreased. Therefore, the pulse width of the setting pulse PD is also decreased. For another example, when the setting resistance value VSR is increased, the predetermined value VP is decreased. Therefore, the pulse width of the setting pulse PD and the pulse width of the logic pulse of the setting signal SS are also decreased. On the other hand, when the set resistance value VSR is decreased, the predetermined value VP is increased. Therefore, the pulse width of the setting pulse PD is also increased. In addition, the setting resistance value VSR may determine a slew rate of the integrated voltage value VIT. In some embodiments, the setting resistance value VSR may determine a threshold of the slew rate of the detection voltage VD.

Figure 4:
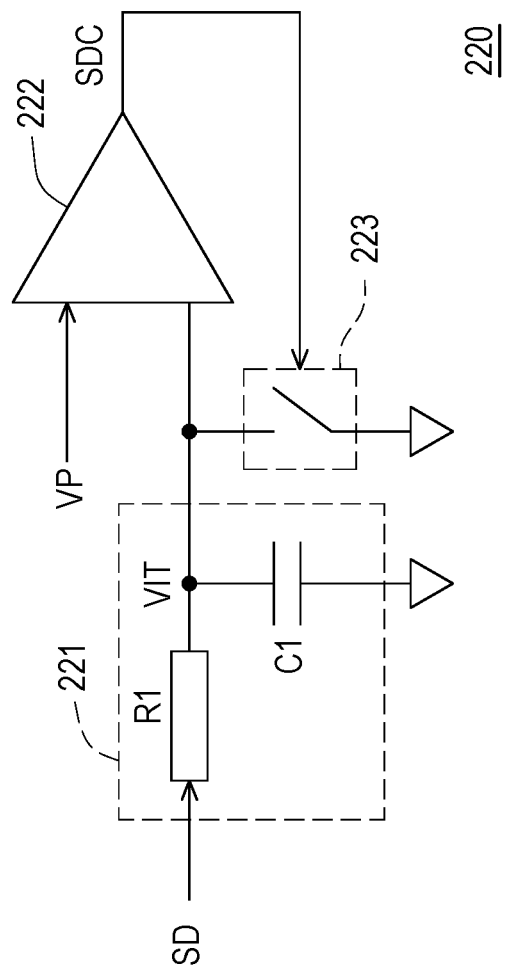
FIG. 4 is a schematic diagram of an integrating circuit according to an embodiment of the disclosure.

Referring to FIG. 1 and FIG. 4 at the same time, FIG. 4 is a schematic diagram of an integrating circuit according to an embodiment of the disclosure. In the embodiment, an integrating circuit 220 includes a charge accumulation circuit 221, a comparison circuit 222 and a pull-down circuit 223. The charge accumulation circuit 221 is coupled to the first logic circuit 110. The charge accumulation circuit 221 uses the detection signal SD to perform charging to increase the integrated voltage value VIT. For example, the charge accumulation circuit 221 includes a resistor R1 and a capacitor C1. A first terminal of the resistor R1 receives the detection signal SD. The capacitor C1 is coupled between a second terminal of the resistor R1 and the ground terminal of the secondary side circuit 13. The charge accumulation circuit 221 uses the detection signal SD with a high logic value to charge the capacitor C1. Therefore, the integrated voltage value VIT located at the second terminal of the resistor R1 gradually increases. A resistance value of the resistor R1 and a capacitance value of capacitor C1 may determine the rise of integrated voltage value VIT.

In the embodiment, the comparison circuit 222 is coupled to the charge accumulation circuit 221. The comparison circuit 222 receives the integrated voltage value VIT and the predetermined value VP. The comparison circuit 222 compares the integrated voltage value VIT with the predetermined value VP, and provides a discharge signal SDC when the integrated voltage value VIT rises to the predetermined value VP. The pull-down circuit 223 is coupled to the charge accumulation circuit 221 and the comparison circuit 222. The pull-down circuit 223 pulls down the integrated voltage value VIT in response to the discharge signal SDC. For example, the pull-down circuit 223 pulls down the integrated voltage value VIT to a low voltage level (for example, ground level) in response to the discharge signal SDC. In the embodiment, the pull-down circuit 223 may be implemented by a transistor switch or a transmission gate.

In summary, the first logic circuit generates the detection signal according to the detection voltage. The integrating circuit generates the setting pulse according to the detection signal. The logic gate outputs the setting signal based on the setting pulse and the comparison signal. The second logic circuit continuously provides the turn-on control signal in response to the setting signal. In this way, the control circuit may provide a stable turn-on control signal to control the synchronous rectification switch. Moreover, the first logic circuit may be an inverter. The first logic circuit determines the logic level of the detection signal based on a comparison result between the detection voltage and at least one threshold voltage value in the first logic circuit. In this way, the embodiment does not require an additional comparator to determine the logic level of the detection signal.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A control circuit for a synchronous rectification switch of a power converter, wherein the synchronous rectification switch and a transformer of the power converter are coupled to a connection node, the control circuit comprising:

a first logic circuit, coupled to the connection node, and configured to receive a detection voltage on the connection node, and provide a detection signal according to the detection voltage;

an integrating circuit, coupled to the first logic circuit, and configured to perform an accumulation operation on an integrated voltage value based on the detection signal, and discharge the integrated voltage value when the integrated voltage value rises to a predetermined value, so as to generate a setting pulse;

a setting comparator, configured to receive the detection voltage and a first predetermined voltage, and provide a comparison signal according to a comparison result of the detection voltage and the first predetermined voltage;

a logic gate, coupled to the integrating circuit and the setting comparator, and configured to output a setting signal according to the setting pulse and the comparison signal; and a second logic circuit, coupled to the logic gate, and configured to continuously provide a turn-on control signal in response to the setting signal, wherein the synchronous rectification switch is turned on in response to the turn-on control signal.

2. The control circuit as claimed in claim 1, wherein the first logic circuit is an inverter.

3. The control circuit as claimed in claim 1, wherein when the detection voltage is lower than the first predetermined voltage, the setting comparator provides the comparison signal with a first logic value, and when the detection voltage is higher than or equal to the first predetermined voltage, the setting comparator provides the comparison signal with a second logic value.

4. The control circuit as claimed in claim 3, wherein the first logic value is a high logic value, the second logic value is a low logic value, the logic gate is an AND gate, and when the comparison signal has the first logic value, the logic gate outputs the setting signal.

5. The control circuit as claimed in claim 4, further comprising:

a reset comparator, configured to receive the detection voltage and a second predetermined voltage, and configured to provide a reset signal based on a comparison result of the detection voltage and the second predetermined voltage, wherein the second logic circuit provides a turn-off control signal in response to the reset signal, wherein the synchronous rectification switch is turned off in response to the turn-off control signal, and wherein the first predetermined voltage is lower than the second predetermined voltage.

6. The control circuit as claimed in claim 5, wherein:

when the detection voltage is higher than the second predetermined voltage, the reset comparator provides the reset signal with the first logic value, and when the detection voltage is lower than or equal to the second predetermined voltage, the reset comparator provides the reset signal with the second logic value.

7. The control circuit as claimed in claim 6, wherein:

the second logic circuit is an SR flip-flop, the second logic circuit has a setting input terminal, a reset input terminal, and an output terminal, the setting input terminal is coupled to an output terminal of the logic gate, the reset input terminal is coupled to an output terminal of the reset comparator, and the output terminal is coupled to a control terminal of the synchronous rectifier switch.

8. The control circuit as claimed in claim 1, wherein the power converter comprises:

an adjustment circuit, coupled to the integrating circuit, and configured to adjust the predetermined value according to a setting resistance value.

9. The control circuit as claimed in claim 8, wherein the adjustment circuit comprises:

a resistance value generating circuit, configured to provide the setting resistance value.

10. The control circuit as claimed in claim 1, wherein the integrating circuit comprises:

a charge accumulation circuit, coupled to the first logic circuit, and configured to use the detection signal to perform charging to increase the integrated voltage value;

a comparison circuit, coupled to the charge accumulation circuit, and configured to compare the integrated voltage value with the predetermined value, and provide a discharge signal when the integrated voltage value rises to the predetermined value; and a pull-down circuit, coupled to the charge accumulation circuit and the comparison circuit, and configured to pull down the integrated voltage value in response to the discharge signal.

* * * * *